United States Patent [19]

Jacobons

[11] Patent Number: 4,934,763
[45] Date of Patent: Jun. 19, 1990

[54] GLOVE BOX FOR REMOVAL OF HAZARDOUS WASTE FROM VARIOUS PIPE CONFIGURATIONS

[76] Inventor: Earl B. Jacobons, 510 S. Shore Dr., Crystal Lake, Ill. 60014

[21] Appl. No.: 371,554

[22] Filed: Jun. 26, 1989

Related U.S. Application Data

[63] Continuation-in-part of Ser. No. 189,611, May 3, 1988, Pat. No. 4,842,347.

[51] Int. Cl.$^5$ .............................................. A61G 11/00
[52] U.S. Cl. ............................................. 312/1; 312/3; 24/587
[58] Field of Search .................. 24/587, 588, 578; 312/1, 3

[56] References Cited

U.S. PATENT DOCUMENTS

| | | | |
|---|---|---|---|
| 2,862,307 | 12/1958 | Bloomer et al. | 312/1 |
| 2,978,069 | 4/1961 | Harrah | 24/587 |
| 4,335,712 | 6/1982 | Trexler | 312/1 |
| 4,783,129 | 11/1988 | Jacobson | 312/1 |
| 4,812,700 | 3/1989 | Natale | 312/1 |
| 4,820,000 | 4/1989 | Jacobson | 312/1 |
| 4,842,347 | 6/1989 | Jacobson | 312/1 |

Primary Examiner—Joseph Falk
Attorney, Agent, or Firm—Leydig, Voit & Mayer

[57] ABSTRACT

An improved glove box hazardous waste removal system especially for confining pipes, including a pair of semirigid side walls securable at least at one edge to one another to form a rigid unit and including a sealing structure to accommodate an intersecting pipe configuration. The box includes sealable structures on each end thereof, sealable to the pipe structure being confined. The side walls include a flexible skirt attached to the opposite edge and including a sealable bottom opening on the skirt. The skirt includes an improved attachment structure for securely attaching disposable burial bags thereto.

30 Claims, 4 Drawing Sheets

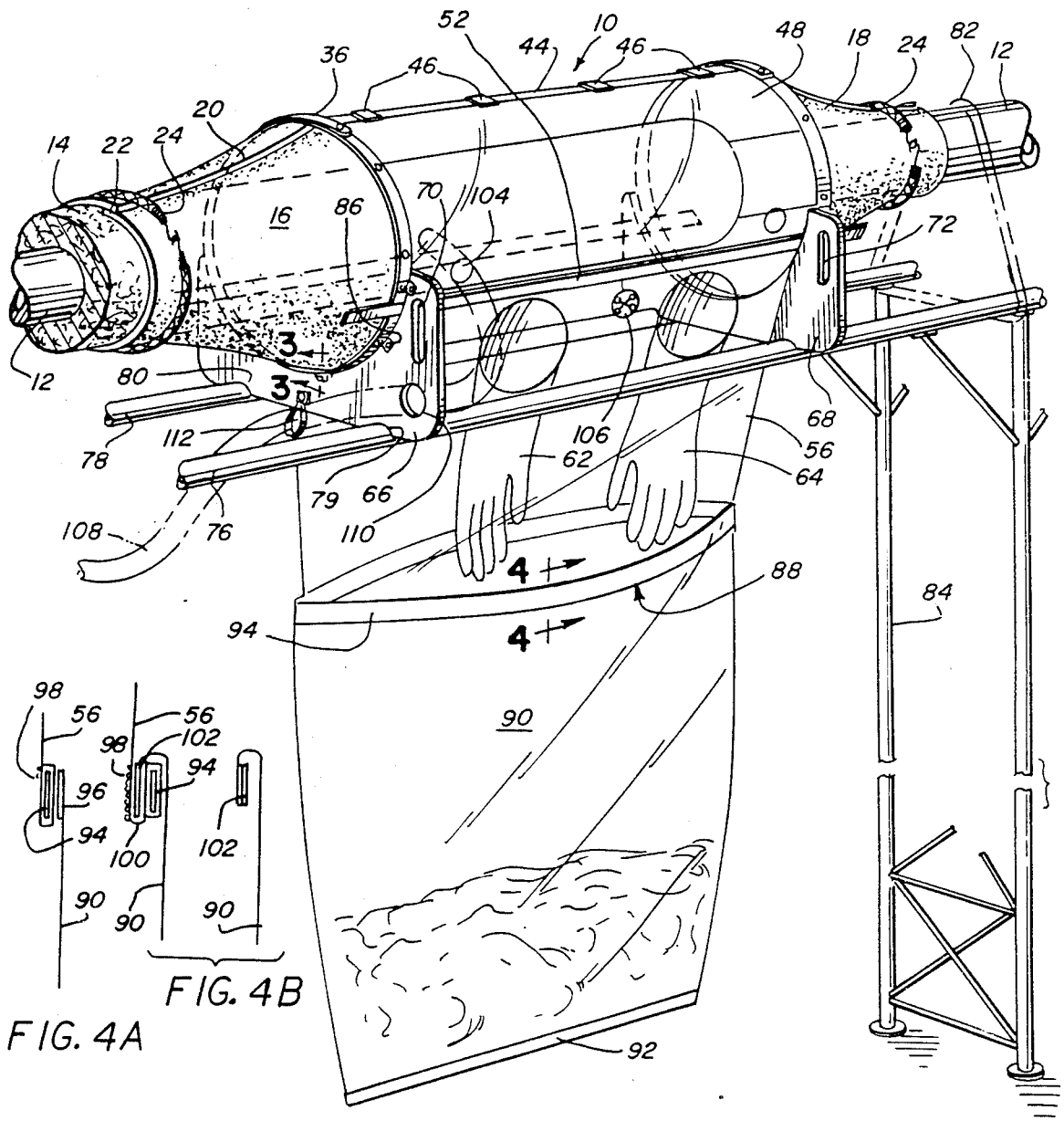
FIG. 1
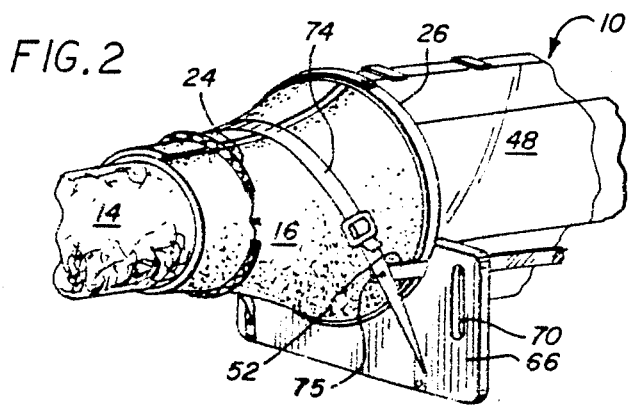
FIG. 4A
FIG. 4B
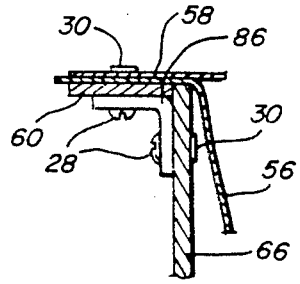
FIG. 2
FIG. 3

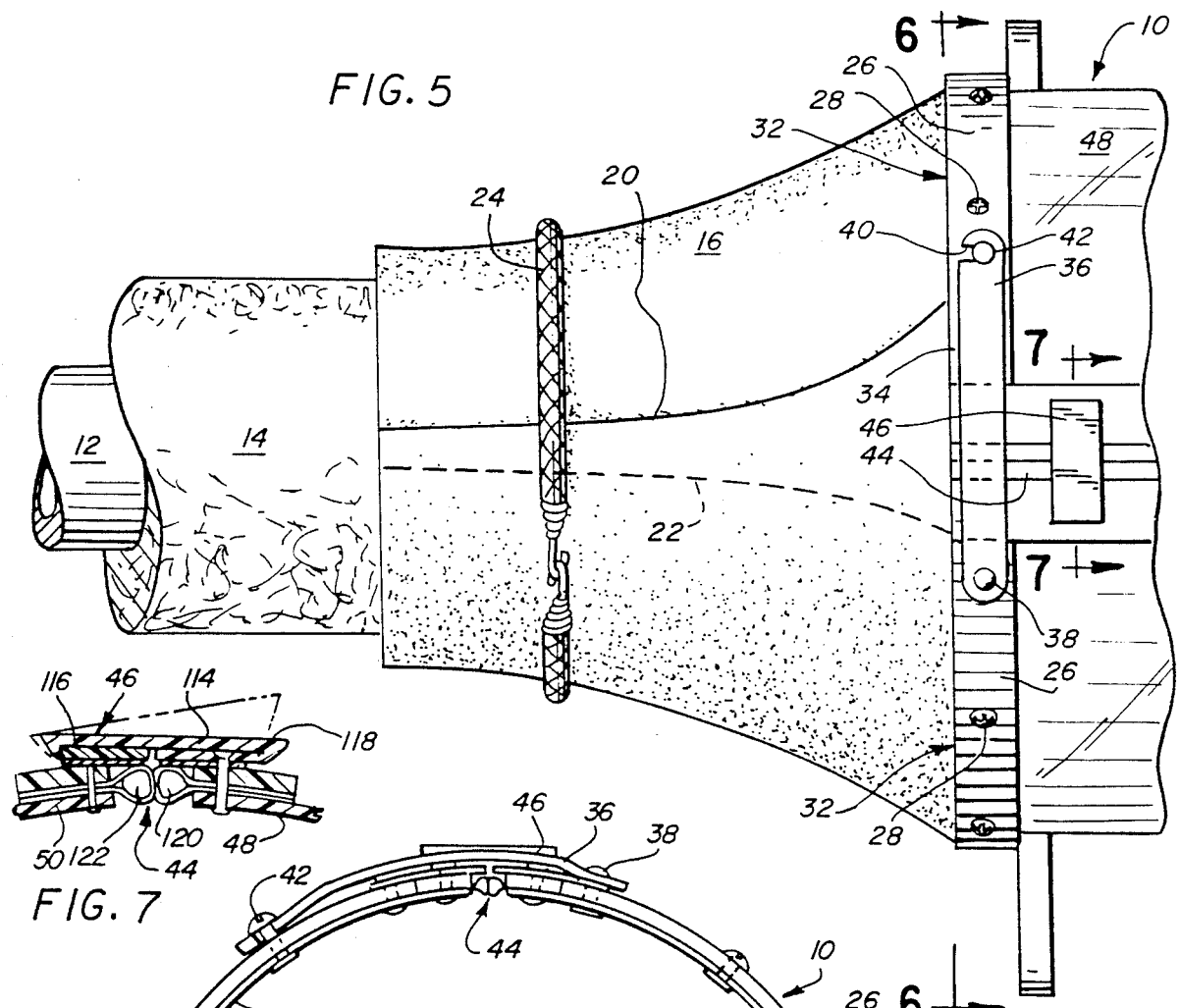
FIG. 5
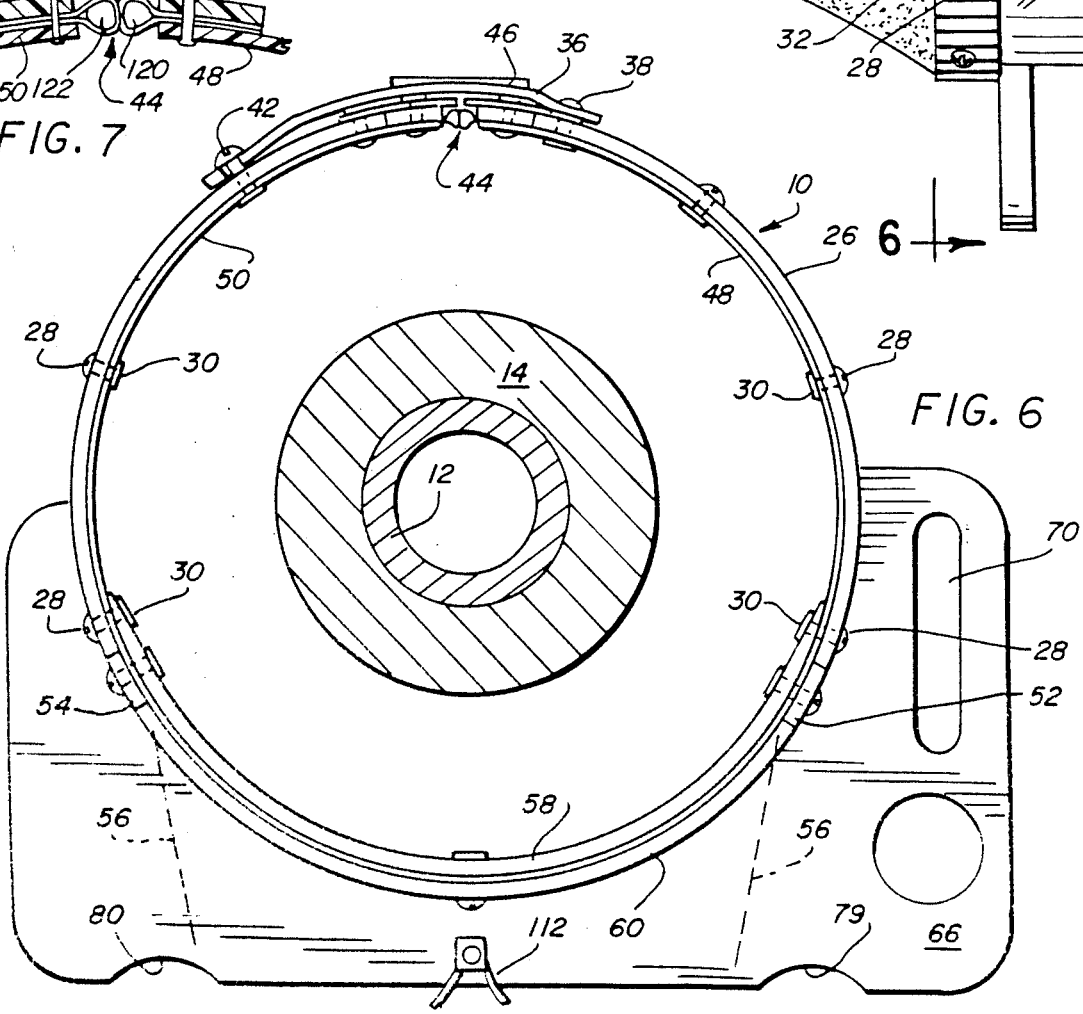
FIG. 7
FIG. 6

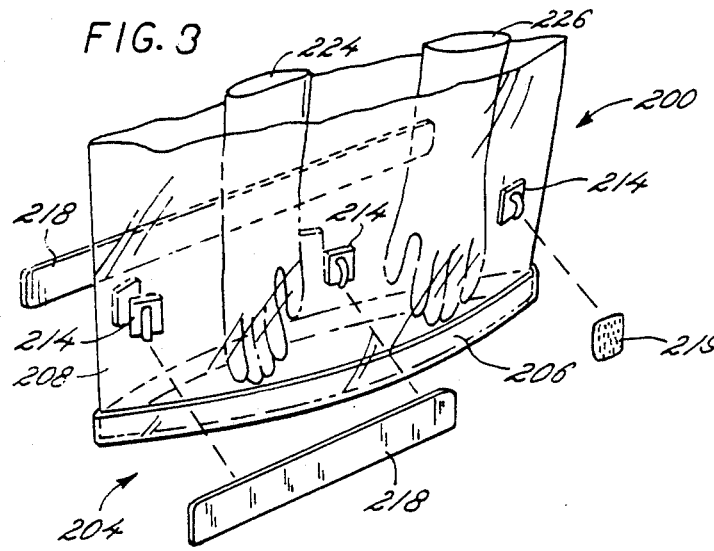
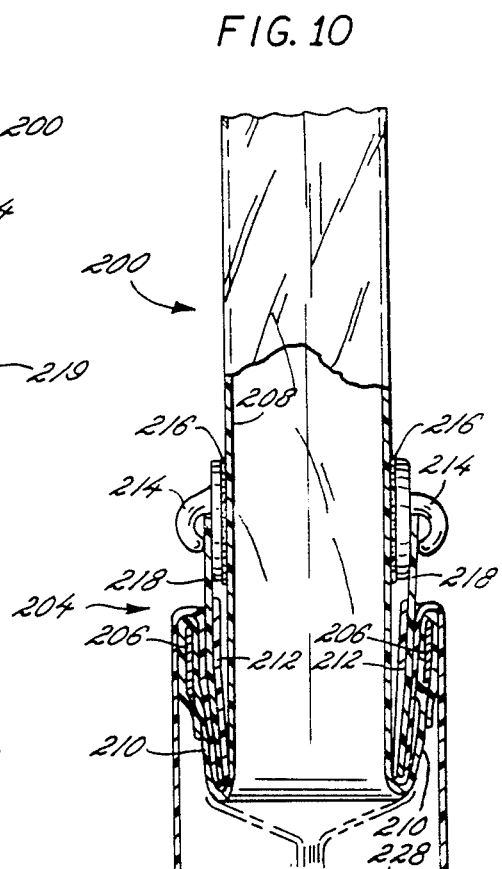
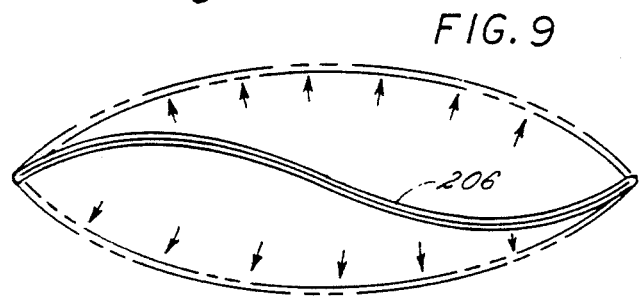
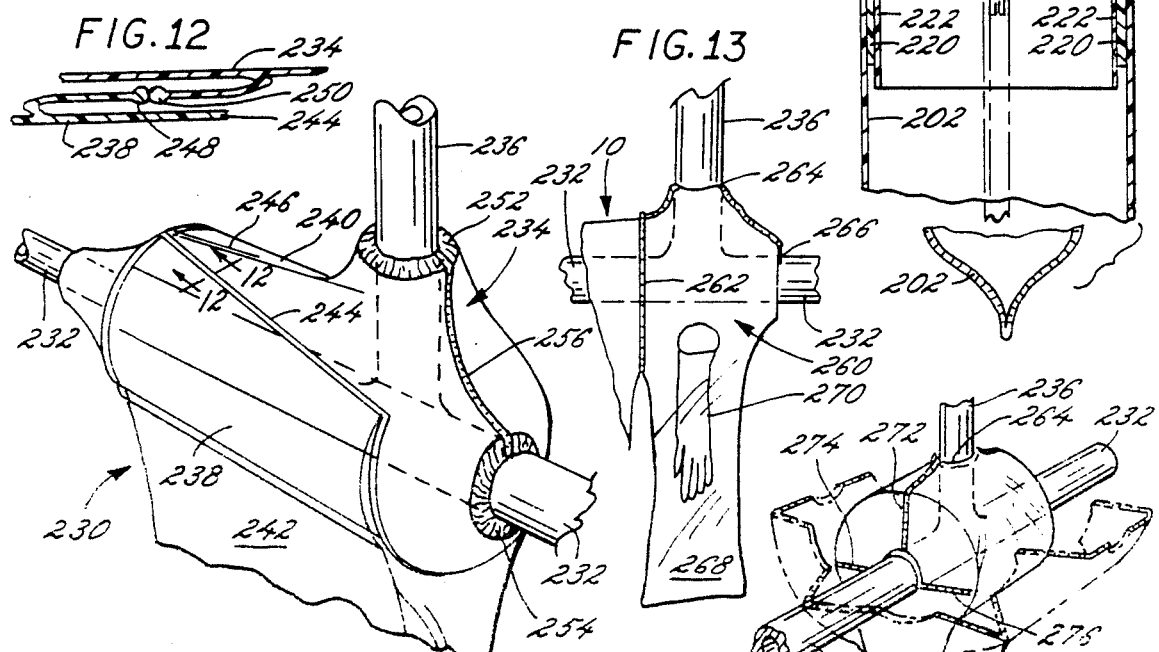
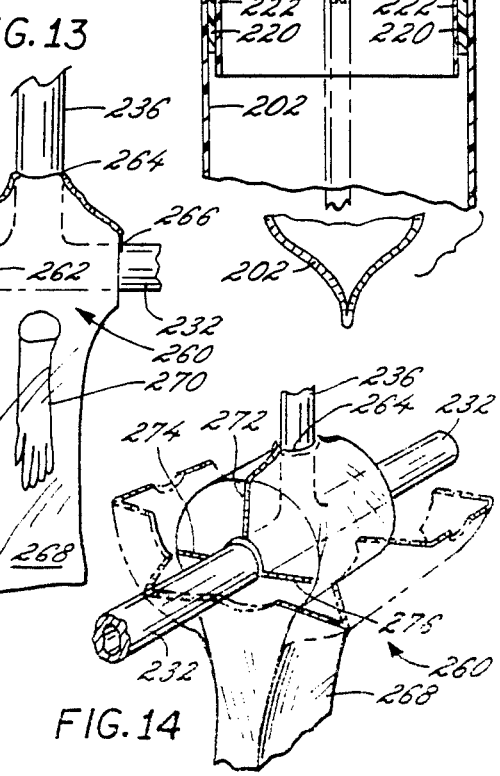

GLOVE BOX FOR REMOVAL OF HAZARDOUS WASTE FROM VARIOUS PIPE CONFIGURATIONS

CROSS REFERENCE TO RELATED APPLICATION

This application is a continuation-in-part of Ser. No. 189,611, filed May 3, 1988, now U.S. Pat. No. 4,842,347, the disclosure of which is incorporated herein by reference.

BACKGROUND OF THE INVENTION

The invention relates generally to hazardous waste removal systems and more particularly to an improved glove box removal system for removing hazardous wastes, such as asbestos insulation in a defined area, especially on hot or cold pipes. The system can be utilized on numerous pipe configurations, such as Tee joints.

Numerous prior art glove bag waste removal systems have been utilized for a considerable period of time for removing waste from a closely defined work area in which the contaminants or hazardous wastes are confined. The worker is protected from the wastes since the wastes are confined inside of the system and the worker works in the system but avoids direct contact with the wastes by utilizing the well-known glove bag concept.

One particular application for glove bag waste removal systems is in removing coatings or insulation from pipes which material is or contains asbestos. The prior art glove bags are secured and sealed around the pipes at the tops of the bags, such as by wrapping the open ends of the bag top around the pipe and taping the openings shut. The bags are utilized to remove the asbestos material and are then removed from the pipe and sealed for disposal. Typically, the bags are placed in a second bag for disposal.

The bags frequently are made from polymers, which do not give sufficient strength in all uses. Also, the polymer bags have a bottom seal which can rupture. Wrapping and upwrapping the tops of the bag onto and from the pipe can cause a poor seal or release of the asbestos materials from the bag. The bags are utilized under negative pressure and typically include one or more openings for vacuum lines and for water spray lines or nozzles for wetting down the material as an extra safety precaution. These openings can be the cause of additional asbestos leaks. The bags often also contain an internal tool pouch, which generally is open at the top which catches the waste.

A number of the prior polymer constructed glove bag waste systems are intended for a single use. although Applicant's below-referenced systems are reusable. It would be desirable to provide a waste removal system, which has the advantages of the disposable glove bag system, but also has a structure which is durable, can withstand high temperatures and provides significant reusability. One such system is disclosed in the parent application, Ser. No. 189,611 entitled "Improved Glove Box For Removal Of Hazardous Waste From Pipes", filed May 3, 1988, the disclosure of which is incorporated herein by reference. Two somewhat related glove bag waste removal systems and applications are disclosed in application Serial No. 001,074, entitled "Hazardous Waste Glove Bag Removal System" now U.S. Pat. No. 4,783,129 and Ser. No. 001,075, entitled "Glove Bag Waste Removal System For Asbestos Impregnated Brakes" now U.S. Pat. No. 4,820,000, both filed Jan. 7, 1987, the disclosures of which also are incorporated herein by reference.

It further would be desirable to ensure the sealing of waste in the system and to provide a structure which can be utilized on different pipe configurations, such as Tee joints.

SUMMARY OF THE INVENTION

The above and other disadvantages of prior art hazardous waste glove bag removal systems and techniques are overcome in accordance with the present invention by providing an improved hazardous waste box, which easily is mounted and removed from various pipe configurations while protecting the worker from release of the hazardous materials. The box has a pair of upper, generally optically clear, flexible, but rigid walls which are mounted to be opened for placing over at least a portion of the pipe configuration and the box can be moved along all or a portion of the pipe configuration.

The box includes end insulating securing and sealing structures which are sealable over a wide variety of pipe sizes and configurations. When the box is secured and sealed to the pipe or pipe configuration, it forms a structure which is integrally maintained under slightly negative pressure conditions. The box is mounted onto the pipe configuration by means which are adjustable to provide a clearance work space over the top of the pipe. The box walls are formed to include a bottom opening and has a flexible skirt depending therefrom integrally formed with the upper walls. The skirt includes a bottom sealable opening to which waste burial bags are removably attached by clips and the burial bags are internally sealable before detaching from the box.

The box flexible skirt includes at least one glove sleeve and at least one self-sealing access sleeve for contamination free access to the interior of the box by vacuum or water spray probes. The flexible skirt of the box preferably is made from heavy gauge, optically clear, or reinforced translucent polyvinyl (PVC) material. The box includes a top flexible opening member which accommodates pipe hanging structures. The box also includes top and end sealing structures, which can accommodate various pipe configurations, such as Tee joints.

BRIEF DESCRIPTION OF THE DRAWINGS

FIGS. 1–7 describe the embodiments of the parent application;

FIG. 1 is a perspective view of a pipe with a first embodiment of the improved glove box hazardous waste removal system of the parent application mounted thereon;

FIG. 2 is a partial perspective view of a pipe with a second embodiment of the improved glove bag hazardous waste removal system of the parent application mounted thereon;

FIG. 3 is a side sectional view of a mounting bracket of the system of the parent application taken along the lines 3—3 in FIG. 1;

FIGS. 4A and 4B are partial side sectional views of embodiments of the disposal bag mounting of the parent application taken along the lines 4—4 of FIG. 1;

FIG. 5 is a partial side view of the system of FIG. 1;

FIG. 6 is an end sectional view of the system of FIG. 5 taken along the line 6—6 therein;

FIG. 7 is a partial side sectional view illustrating a closure of the system of FIG. 5 taken along the line 7—7 therein;

FIGS. 8–15B describe embodiments of the present invention;

FIG. 8 is a partial perspective view of the improved disposable bag retaining structure of the present invention;

FIG. 9 is a top view of a portion of the structure of FIG. 8;

FIG. 10 is a side sectional view of the structure of FIG. 8;

FIG. 11 is a perspective view of one type of Tee pipe accommodating embodiment of the glove box hazardous waste removal system of the present invention;

FIG. 12 is a partial sectional view of the system of FIG. 11 taken along the line 12—12 therein;

FIGS. 13 and 14 are perspective views of a further pipe configuration accommodating embodiment of the glove box hazardous waste removal system of the present invention; and FIGS. 15A and 15B are perspective views of an end closure embodiment for the glove box hazardous waste removal system of the present invention and a diaphragm embodiment for utilization therewith.

DESCRIPTION OF THE PREFERRED EMBODIMENTS

Figure 15A:
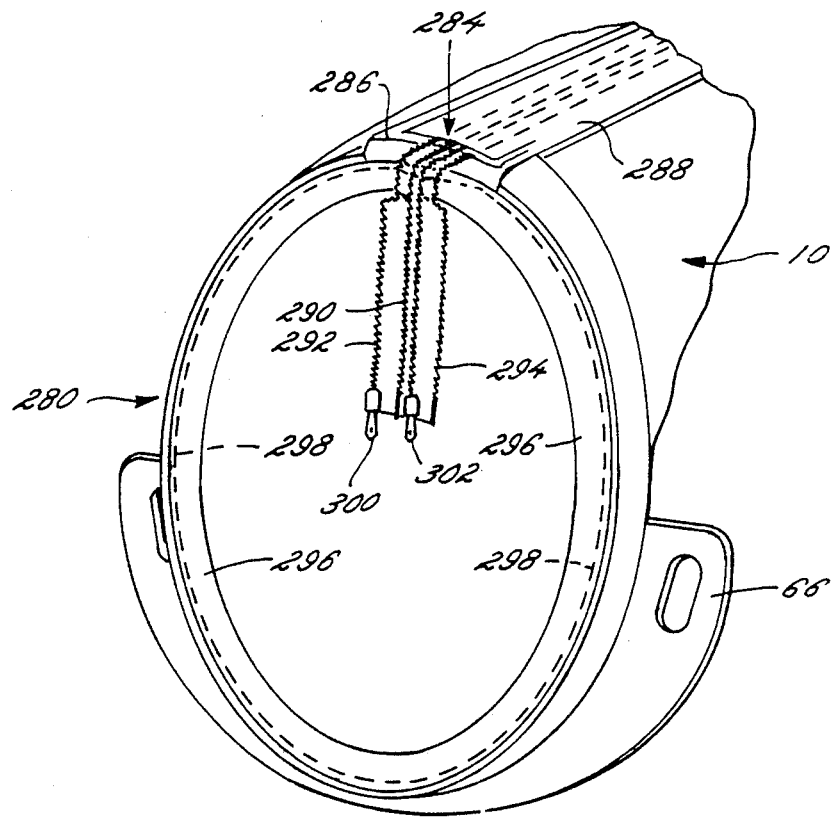

FIGS. 1–7 are a description of the parent application, Ser. No. 189,611, filed May 3, 1988, now U.S. Pat. No. 4,842,347, which is incorporated herein by reference.

Referring to FIG. 1, a first embodiment of the improved glove box hazardous waste removal system of the parent application is designated generally by the reference character 10. The box 10 is illustrated mounted onto a pipe 12, which pipe generally will have a hazardous material, most generally asbestos, covering 14 thereon, such as for insulation. The box 10 is designed to be moved along the pipe 12 for repairing the pipe 12 and/or to remove the hazardous waste/insulation 14 therefrom.

To facilitate the installation, sliding and removal of the box 10 on or from the pipe 12, the box 10 includes a pair of sealable, preferably insulating, securing end sleeves 16 and 18. The securing sleeves 16 and 18 are sized to accommodate a range of bare pipes 12, such as illustrated by the sleeve 18 and also with the insulation 14 thereon as illustrated by the sleeve 16. The securing end sleeves 16 and 18 are substantially identical and therefor only end sleeve 16 will be discussed in detail. The sleeve 16 is formed from a flexible material, such as a rubber, latex or foam material, and is formed in the shape of a cone with a pair of free edges 20 and 22. The particular shape and material of the sleeve 16 is not critical, as long as the sleeve 16 can be opened for the box 10 to be placed over the pipe 12 and to enable the box 10 to be moved along the pipe 12 as the insulation 14 is removed therefrom.

The overlapping edges 20 and 22 of the sleeve 16 are sealed against one another when the sleeve 16 is secured. The rubber or latex sleeve material preferably is removable to fit pipe sizes in a wider size range and is formed of a material which can withstand the temperatures in hot pipe applications. The prior polymer formed glove bags have a low melting temperature and cannot withstand high temperatures. The sleeve 16 also can be two overlapping flexible panels.

The sleeves 16 and 18 can be secured around the pipe 12 and the insulation 14 by one or more suitable, preferably elastic or adjustable, securing straps 24. The strap 24 also could be a conventional drawstring attached to the sleeves 16 and 18. The straps 24 also may not be required since the rubber or latex sleeve material can seal against itself. The operation of the sleeve 16 is best illustrated in FIG. 5, wherein the overlapping ends 20 and 22 are reversed from that illustrated in FIG. 1.

The sleeve 16 can be attached to the box 10 by an end band 26. The band 26 preferably is removably secured to the box 10 by a plurality of threaded bolts 28, each of which includes an internally threaded stud 30 (FIG. 6) to securely clamp the box elements together. One end 32 of the sleeve 16 is secured to the box 10 by the band 26, including the end portion of the covered free end 22. The free end 20 of the sleeve 16, however, includes a portion 34 which extends beyond the secured end 32 and is free from the band 26 and secured to an arm 36. The sleeve 16 also can be attached to the box 10 by sewing through the box material, as will be described hereinafter. Further, the sleeve 16 can be attached by a zipper (not illustrated), sewn or otherwise, to attach the box 10.

The arm 36 can be pivotably mounted onto the band 26 and hence to the box 10, such as by a bolt 38, as illustrated. The opposite end of the arm 36 can include a notch or other securing means 40, which can be snapped over a bolt 42 to secure the overlapping free end 20 over the underlying end 22. The orientation of the ends 20 and 22 and hence the arm 36 can be reversed as illustrated in FIG. 1. The arm 36 also can just be a flexible piece and can be bent back to provide a sufficient opening.

The sleeve 16 thus is easily secured around the pipe 12 and the insulation 14 by the strap 24 and the arm 36. The sleeve 16 is opened to move or remove or to place the box 10 onto the pipe 12 by releasing and pivoting the arm 36 toward the end 22 and removing the strap 24.

Referring again to FIG. 1, the box 10 includes a top opening 44, which can be secured and released by a plurality of releasable fasteners 46. The fasteners 46 can be a molded draw latch, such as sold by Southco, Inc., Concordville, Pa. 19331. The opening and closing of the box 10 will be described hereinafter with respect to FIGS. 5–7.

The box 10 preferably is formed from optically clear or substantially clear materials to provide unlimited viewing access into the interior of the box 10 by the worker removing the insulation 14 or otherwise working on the pipe 12. As best illustrated in FIGS. 1 and 6, the box 10 includes a pair of semirigid arcuate, substantially optically clear, side walls 48 and 50 which ar bent over and secured at the opening 44 by the fasteners 46. One of a pair of support bars 52 and 54 is secured to the bottom of each side wall 48 and 50 and to provide rigidity to the upper box structure. The support bars 52 and 54 are utilized to clamp an open ended flexible skirt 56 to the side walls 48 and 50. The skirt 56 also is fastened to the end of the box 10 by at least a pair of end clamping bands 58 and 60. The band 58 is clamped to the side walls 48 and 50 and to the support bars 52 and 54 by the bolts 28 and studs 30. The band 58 can be flatter than illustrated, to provide a wider top opening in the skirt 54.

The skirt 54 preferably is formed from a heavy gauge, on the order of twenty (20), optically clear or translucent reinforced PVC material to have sufficient strength and body to support a pair of glove sleeves 62 and 64 therein. The glove sleeves 62 and 64 are formed in the flexible skirt 54 to provide better movement thereof and to locate the sleeves below the axis of the pipe 12 for the convenience of the worker. The worker can see into the box 10 through the walls 48, 50.

The box 10 preferably is mounted onto a pair of substantially identical rigid end boards 66 and 68, only one of which, 66, will be described. The end boards 66 and 68 add rigidity to the structure of the box 10 and further can provide handles 70 and 72 to aid in lifting and moving the box 10. The box 10 can be mounted onto the pipe 12 and the insulation 14 by an adjustable hanging strap 74, as illustrated in FIG. 2. The strap 74 preferably is connected to an end 75 of the support bar 52. By utilizing the strap 74, the position of the box 10 can be adjusted to provide the desired clearance above the pipe 12 and the insulation 14 so that the worker easily can work thereon through the glove sleeves 62 and 64.

The box 10 thus includes an upper substantially optically clear body including the walls 48 and 50 which forms a generally cylindrical sealed structure which has sufficient integrity to be reusable and to maintain its shape under the slightly negative operating pressure applied to the box 10. The upper body portion, including the sealing sleeves 16 and 18, can withstand hot temperatures from the pipes 12, which the polymer flexible skirt 56 and the prior polymer glove bags cannot withstand.

The box 10 also can be mounted on the pipe 12 by an adjustable pair of rails 76, 78, such as illustrated in FIG. 1. The end board 66 can include a mating pair of notches 79 and 80 which will sit onto the rails or pipes 76, 78. The height of the rails 76, 78 and hence the bag 10 can be adjusted by a plurality of straps 82 (only one of which is illustrated). The rails 76, 78 also can be mounted on standards 84 (only one of which is illustrated) which can themselves be adjustable The rails 76, 78 preferably are of sufficient length for the box 10 to be moved into at least a second position, after the confined area of the first illustrated position has had the insulation 14 removed therefrom. The rails 76, 78 also can be utilized in conjunction with the strap 74, to only provide support for the box 10 when it is desired to release and move the box 10.

The securing of a top portion of the skirt 56 and the end board 66 is best illustrated in FIG. 3. The skirt 56 is clamped between the end bands 58 and 60, which are also secured to the end board 66 by an L-shaped bracket 86 and the bolts 28 and studs 30. Alternatively, the skirts 56 can be sewn to the board 66.

The bottom of the skirt 56 includes a sealing structure 88 to seal the bottom of skirt 56 and hence the box 10 to a disposable waste or burial bag 90. The bag 90 preferably can be a relatively cheap disposable polyethylene material which can have a conventional seam 92 at the bottom thereof or can be formed without the seam 92. The sealing structure 88 preferably includes a spring hinge member 94 formed in the bottom edge of the skirt 56, as best illustrated in FIGS. 4A and 4B.

The spring hinge member 94 can be formed of spring steel bands and can be of the pop open or closed type utilized in briefcases, such as sold by Leonardi Mfg. Co., Inc., Weedsport, N.Y. 13166. The spring hinge member 94 generally has two positions, one closed, with the bands together and a second open position, where the bands are locked into an elliptical shape by spring mechanisms at each end of the member 94. The hinge 94 preferably is a pair of bands hinged only at each end of the skirt 56, as illustrated in FIG. 1, or can have multiple side hinge pieces. The bag 90 is attached in one of several ways. The bag 90 can include a strip of tape 96 inside the top thereof, as illustrated in FIG. 4A. The closed hinge 94 is bent in an arc to insert the bag 90 therearound and then released to provide sufficient tension to hold the top of the bag 90 onto the skirt 56. To open the top of the bag 90, the spring hinge 94 is bowed outwardly into the open position and further applies tension to the bag 90. The tape 96 adheres to the skirt 56, further ensuring that the bag 90 is sealed thereto.

The inside of the skirt 56 can include a hook and eye arrangement 98 such as sold under the trademark Velcro to ensure that the skirt 56 is sealed when the bag 90, with waste material therein, is removed. The bag 90 preferably is just twisted at its top, tied and then cut free from the skirt 56. The remainder of the cutoff bag 90 then easily is removed from the sealed skirt 56, to ensure that no material leaks from the box 10, when the bags 90 are replaced or changed.

The spring hinge 94 also can be formed in an upturned edge 100 of the skirt 56 and can capture a plastic member 102 sealed or otherwise secured to the upper end of the bag 90 in a hook-type arrangement, as illustrated in FIG. 4B.

The box 10 includes at least one sealed vacuum inlet or sleeve 104 and at least one sealed access port or sleeve 106. The vacuum inlet preferably is formed in the semirigid wall 48 since a vacuum line 108 is merely attached thereto. The end board 66 can include an opening 110 into which the line 108 can be inserted and can include a strap 112 to secure the line 108 to the box 10. The vacuum line 108 maintains the interior of the box 10 at a negative pressure in a conventional manner to ensure that the airborne contaminants are captured and removed by the vacuum line, which is connected to a conventional filter unit (also not illustrated). The port 106 preferably is formed in the skirt 56 to provide flexibility for the worker in inserting and manipulating an air or water nozzle, not illustrated, but could also be formed in the wall 48.

The securing and releasing of the box 10 is best illustrated in FIGS. 5–7. Referring to FIG. 7, the fastener 46 includes a top or latch member 114 hingedly formed with a bottom piece 116. The piece 116 is secured to the wall 50. A separate bottom piece 118 forms a snap lock with the top member 114. The piece 118 is secured to the other wall 48 on the opposite of the opening 44. The opening 44 includes a pair of foam rubber or other flexible sealing members 120 and 122 attached to opposite walls 48 and 50, on opposite sides of the opening 44. The members 120 and 122 provide a vacuum seal when the opening 44 is closed, but also provide sufficient flexibility to accommodate pipe hangers or other pipe supports (not illustrated) sealingly therethrough. The members 120 and 122 and the fastener 46 could be replaced by a zipper (not illustrated) and the zipper or the members 120 and 122 also can be sewn to the walls 48 and 50.

When it is desired to move the box 10, the spring hinge 94 is closed and vacuum is continuously applied. Then the strap 24, if utilized, and the arm 36 are released and the sleeve ends 20 and 22 then are free to be separated. The fasteners 46 can be released if necessary to allow the walls 48 and 50 to spring slightly apart. Generally, the fasteners 46 would not need to be released and the unit 10 then can be moved on the rails 76 and 78 or by hand to the new position. When the box 10 is placed in the new position it is sealed into position in a reverse order. The fasteners 46 could be opened if a pipe hanging structure obstructs the movement.

Referring to FIGS. 8–10, an improved glove box hazardous waste removal system of the present invention is designated generally by the reference numeral 200. The glove box 200 includes a disposable waste or burial bag 202 removably attached thereto by an improved disposable bag retaining structure 204. The glove box 200 can be essentially the same structure as the glove box 10.

As seen in FIG. 9, a spring hinge member 206 is located in the bottom skirt 208 of the glove box 200 and is bent into an S-shape when it is to be inserted into the top of the bag 202. The spring hinge member 206 is allowed to open, as illustrated in dotted lines, to stretch the bag 202 around the skirt 208 and to secure it thereto. It has been found that a more secure structure can be necessary to ensure that the bag 202 is securely retained on the skirt 208 without any leakage of the material therein.

The skirt hinge member 206 is formed in an upwardly opening fold 210 in the bottom of the skirt 208. A top edge 212 of the bag 202 is folded or tucked into the fold 210. To further ensure that the bag 202 does not slip out of the fold 210, a plurality of hooks or clips 214 are secured to the sides of the skirt 208, such as by an appropriate adhesive 216.

A batten 218 is inserted into the fold 210, securing the edge 212 therein. The edge 212 is folded around the batten 218. The batten can be a single long, flexible, planar member as illustrated, or can be a plurality of individual members 219, one of which is illustrated inserted under one hook 214. The battens 218 or 219 are removed when it is desired to remove the bag 202.

To ensure that only a minimal amount of hazardous material can escape, the bag 202 also preferably includes an inner tape or adhering surface 220. The surface 220 is located just below the bottom of the skirt 208 and preferably includes a release paper 222, or other removable cover.

The worker, utilizing one or more glove sleeves 224, 226 can remove the paper 222 when the bag 202 is filled and then the bag 202 can be secured at its top by pressing the surfaces 220 together, as illustrated at 228. The inside of the skirt 208 and the top of the bag 202 can be washed free of material before the bag 202 is closed and removed.

A second glove box hazardous waste removal system 230 of the present invention, illustrated in FIGS. 11 and 12, mounted on a pipe 232, includes an end sealing structure 234 for accommodating a Tee-pipe 236, joining the pipe 232. The glove box 230 can be essentially the same structure as the glove box 10, with one end sleeve 16 and the other end sleeve replaced by the sealing structure 234. The glove box 230 includes a pair of side walls 238 and 240 and a skirt 242 depending therefrom, as before described with respect to the glove box 10. The free edges 244 and 246 of the side walls 238 and 240 include a zipper or other securing structure 248. Instead of the edges 244 and 246 being zipped together, the structure 234 is secured thereto by a mating zipper 250.

The sealing structure 234 is made from a flexible material and includes a pair of end sleeves or closures 252 and 254, which respectively can be sealingly secured around the pipes 236 and 232. The sealing structure 234 also includes a zipper member 256, connecting the two closures 252 and 254, to allow the pipe 236 to be inserted into the sealing structure 234. The sealing structure 234 can be replaced by the end sleeve 18, if no Tee-pipes are encountered.

Referring to FIGS. 13 and 14, a second end sealing structure embodiment 260 of the present invention replaces the end sleeve 18 and totally accommodates the Tee-pipe 236. The glove box 10 (or 230) has a zipper or securing structure 262 mating with a zipper on the end sealing structure 260. The end sealing structure 260 includes two end sleeves 264 and 266 for sealing around the respective pipes 236 and 232. The end sealing structure 260 can include its own waste bag 268, including at least one glove sleeve 270 therein. The bag 268 can be removable if desired. The sleeve 270 allows the worker easily to remove all the hazardous material around the Tee joint of the pipes 232 and 236.

The end sealing structure 260 preferably includes a median zipper or securing member 272 to allow the end sealing structure 260 to be fitted over the pipe 236. Additionally, the end sealing structure 260 preferably includes a plurality of partial zippers or securing members 274 and 276, which allow the end sealing structure 260 to be opened away from the pipes 232, 236, as illustrated by the dotted lines.

Figure 15B:
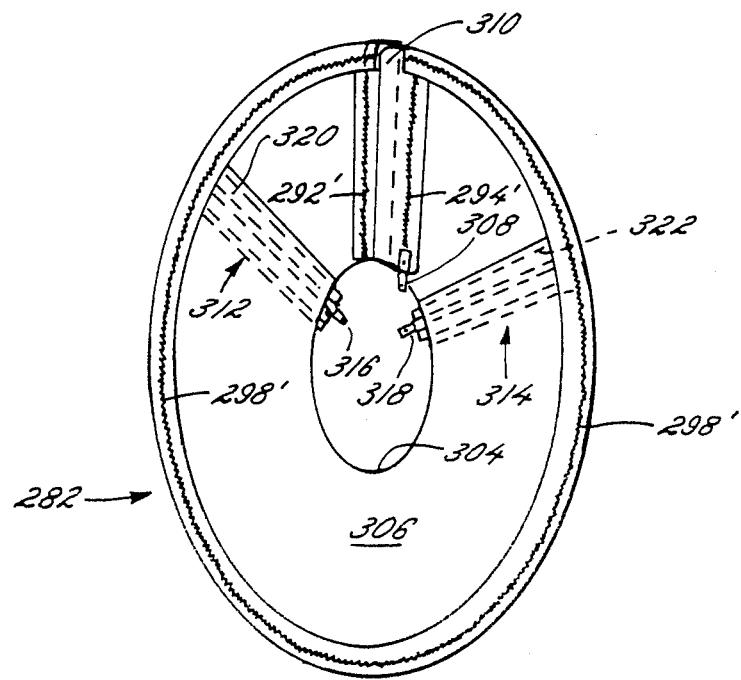

Referring to FIGS. 15A and 15B, a further end closure embodiment 280 of the present invention is illustrated with one closure diaphragm embodiment 282 which can be utilized therewith. The end closure 280 can be utilized with any of the glove boxes 10, 200, etc. For example, the end closure 280 would replace one or both of the end sleeves 16 and 18.

Utilizing the end closure 280, the side walls 48 and 50 are secured together by a single zipper 284. The zipper 284 extends the length of the glove box 10 and preferably includes one or a pair of closure flaps 286 and 288, which aid in sealing the glove box 10 in cooperation with the negative air flow. The zipper 284 includes a zipper extension 290 at each end of the glove box. The zipper extension 290 includes a further diaphragm zipper 292 and 294, secured respectively to each side of the zipper extension 290.

An end closure securing flap 296 is secured around the periphery of the end of the glove box 10 and overlies an end closure securing zipper 298, also extending around the periphery of the glove box 10. The diaphragm zipper 292 includes a zipper pull 300, which is operated to secure the diaphragm zipper to the diaphragm 282 or any other end closing structure, which will be modified to include a companion zipper. The zipper 284 includes a zipper pull 302, illustrated on the extension 290 which closes the diaphragm 282 as well as the glove box 10. The opposite zipper extension (not illustrated) also includes a zipper pull which will secure the diaphragm on the opposite end of the glove box 10 and also can be utilized to close the other end of the glove box 10 to accommodate a pipe hanger.

The diaphragm 282 forms the rest of the pipe closure for the glove box 10. The other end structure also could be utilized. The diaphragm 282 includes a central pipe opening 304 formed in a planar latex end wall 306. The diaphragm 282 includes a peripheral zipper portion 298' which mates with the zipper 298 to sealingly secure the diaphragm 282 to the glove box 10.

The zipper 284 is attached to the diaphragm 282 by the zipper extensions 292 and 294 via mating zipper portions 292' and 294' secured to the diaphragm 282. The portion 294' includes a zipper pull 308 When the zipper pull 302 is secured to close the glove box 10, it first closes the diaphragm 282 and is covered by at least one flap 310. If desired, the diaphragm 282 could be complete as long as the opening 304 was matched to the correct pipe size.

Generally, however, it is desirable to have the diaphragm 282 accommodate a range of pipe sizes or pipe plus insulation sizes. To accommodate a range of pipe sizes, the diaphragm extension 282 includes one and preferably a pair of size adjusting zippers 312 and 314. The zippers 312 and 314 open to the opening 304 and include zipper pulls 316 and 318 which are adjustable to adjust the size of the opening 304. By utilizing the zippers 312 and 314 combined with the elasticity of the diaphragm, the diaphragm 282 can sealingly accommodate a wide range of pipe sizes as well as facilitate the glove box installation around a pipe. Each of the zippers 312 and 314 is covered by at least one flap 320 and 322 to ensure sealing of the diaphragm 282.

Many modifications and variations of the parent application are possible in light of the above teachings. The skirt 56 can include a tool pouch if desired. The box 10 can be formed of any suitable material, but the elements 26, 48, 50, 52, 54, 58, 60, 66 and 68 preferably can be formed from a substantially clear plastic like material such as that sold under the trademark Lexan. The skirt 56 can be formed from PVC or other suitable material. The resulting box 10 is very lightweight. The end sealing sleeves 16, 18 also could be donut shaped foam pieces secured to the walls 48 and 50. The bolts 28 and studs 30 can be utilized, so the skirt 56 can be replaced, if necessary. The skirt 56 also can be sewn to the Lexan material. Also, this allows each of the elements easily to be replaced, such as sleeves 16 and 18, the walls 48, 50 or the skirt 56. It is, therefore, to be understood that within the scope of the appended claims, the parent application may be practiced otherwise than as specifically described.

What is claimed and desired to be secured by Letters Patent of the United States is:

1. An improved reusable glove box hazardous waste removal system, adapted to be mounted onto and removed from pipes or pipe configurations, comprising:
    a sealable box unit including a pair of semirigid side walls having an opening along upper ends thereof, said box unit including means for opening and closing said opening to mount said box unit onto a pipe of pipe configuration and at least one glove sleeve therein;
    said side walls including a flexible skirt depending therefrom, said skirt including means for sealingly attaching a disposable containment bag to an open end of said skirt and means for sealing closing said skirt for attaching and removing said bag therefrom; and
    said box including means for sealing the ends of said box onto said pipe or pipe configuration, including means for sealing at least one end over an intersecting pipe configuration.

2. The system as defined in claim 1 wherein said intersecting pipe configuration end sealing means include an end sealing member including a pair of means for sealing the end sealing member over each pipe of said intersecting pipe configuration.

3. The system as defined in claim 2 wherein said end sealing member includes means for sealing said end sealing member to said opening of said side wall upper ends and one end of said side walls.

4. The system as defined in claim 2 wherein said end sealing member includes releasable securing means between said end sealing means to insert one of said pipes therethrough when said securing means are released.

5. The system as defined in claim 2 wherein said end sealing member includes means for sealing said end sealing member to one end of said side walls when said side wall opening is closed.

6. The system as defined in claim 1 wherein said skirt includes said at least one glove sleeve therein and at least one of said side walls includes a sealed vacuum opening therein.

7. The system as defined in claim 1 wherein said skirt closing means include a spring hinge member attached to said open end of said skirt, said member having a closed and an open position.

8. The system as defined in claim 7 wherein said skirt includes an upwardly opening fold adjacent said spring hinge member and said skirt including clips adjacent said fold and at least one batten securing an upper end of said bag in said fold, said batten secured by at least one of said clips.

9. The system as defined in claim 1 wherein said opening includes flexible means for sealingly accommodating pipe hanging structures therethrough.

10. An improved reusable glove box hazardous waste removal system, adapted to be mounted onto and removed from pipes or pipe configurations, comprising:
    a sealable box unit including a pair of semirigid substantially optically clear side walls having an opening along upper ends thereof, said box unit including means for opening and closing said opening to mount said box unit onto a pipe or pipe configuration and at least one of said side walls includes a sealed vacuum opening therein, said sealed box unit forming a substantially cylindrical rigid unit;
    said side walls including a flexible skirt depending therefrom with at least one glove sleeve therein, said skirt including means for sealingly attaching a disposable containment bag to an open end of said skirt and means for sealing closing said skirt for attaching and removing said bag therefrom; and
    said box including means for sealing the ends of said box onto said pipe or pipe configuration, including means for sealing the ends over an intersecting pipe configuration.

11. The system as defined in claim 10 wherein said intersecting pipe configuration end sealing means include an end sealing member including a pair of means for sealing the end sealing member over each pipe of said intersecting pipe configuration.

12. The system as defined in claim 11 wherein said end sealing member includes means for sealing said end sealing member to said opening of said side wall upper ends and one end of said side walls.

13. The system as defined in claim 11 wherein said end sealing member includes releasable securing means between said end sealing means to insert one of said pipes therethrough when said securing means is released.

14. The system as defined in claim 11 wherein said end sealing member includes means for sealing said end sealing member to one end of said side walls when said side wall opening is closed.

15. The system as defined in claim 10 wherein said skirt closing means include a spring hinge member attached to said open end of said skirt, said member having a closed and an open position.

16. The system as defined in claim 15 wherein said skirt includes an upwardly opening fold adjacent said spring hinge member and said skirt including clips adjacent said fold and at least one batten securing an upper end of said bag in said fold, said batten secured by at least one of said clips.

17. The system as defined in claim 10 wherein said opening includes flexible means for sealingly accommodating pipe hanging structures therethrough.

18. An improved reusable glove box hazardous waste removal system, adapted to be mounted onto and removed from pipes or pipe configurations, comprising:

a sealable box unit including a pair of semirigid side walls having an opening along upper ends thereof, said box unit including means for opening and closing said opening to mount said box unit onto a pipe or pipe configuration and at least one glove sleeve therein;

said side walls including a flexible skirt depending therefrom, said skirt including means for sealingly attaching a disposable containment bag to an open end of said skirt and means for sealing closing said skirt for attaching and removing said bag therefrom including a spring hinge member attached to said open end of said skirt and providing an upwardly opening fold, said member having a closed and an open position and said skirt including clips adjacent said fold and at least one batten securing an upper end of said bag in said fold, said batten secured by at least one of said clips; and said box including means for sealing the ends of said box onto said pipe or pipe configuration.

19. The system as defined in claim 18 wherein said skirt includes said at least one glove sleeve therein and at least one of said side walls includes a sealed vacuum opening therein.

20. The system as defined in claim 18 wherein said sealing means include means for sealing at least one end over an intersecting pipe configuration.

21. The system as defined in claim 20 wherein said intersecting pipe configuration end sealing means include an end sealing member including a pair of means for sealing the end sealing member over each pipe of said intersecting pipe configuration.

22. The system as defined in claim 21 wherein said end sealing member includes means for sealing said end sealing member to said opening of said side wall upper ends and one end of said side walls.

23. The system as defined in claim 21 wherein said end sealing member includes releasable securing means between said end sealing means to insert one of said pipes therethrough when said securing means are released.

24. The system as defined in claim 21 wherein said end sealing member includes means for sealing said end sealing member to one end of said side walls when said side wall opening is closed.

25. An improved reusable glove box hazardous waste removal system, adapted to be mounted onto and removed from pipes or pipe configurations, comprising:

a sealable box unit including a pair of semirigid substantially optically clear side walls having an opening along upper ends thereof, said box unit including means for opening and closing said opening to mount said box unit onto a pipe or pipe configuration and at least one of said side walls includes a sealed vacuum opening therein, said sealed box unit forming a substantially cylindrical rigid unit;

said side walls including a flexible skirt depending therefrom with at least one glove sleeve therein, said skirt including means for sealingly attaching a disposable containment bag to an open end of said skirt and means for sealing closing said skirt for attaching and removing said bag therefrom including a spring hinge member attached to said open end of said skirt and providing an upwardly opening fold, said member having a closed and an open position and said skirt including clips adjacent said fold and at least one batten securing an upper end of said bag in said fold, said batten secured by at least one of said clips; and said box including means for sealing the ends of said box onto said pipe or pipe configuration.

26. The system as defined in claim 25 wherein said sealing means include means for sealing at least one end over an intersecting pipe configuration.

27. The system as defined in claim 26 wherein said intersecting pipe configuration end sealing means include an end sealing member including a pair of means for sealing the end sealing member over each pipe of said intersecting pipe configuration.

28. The system as defined in claim 27 wherein said end sealing member includes means for sealing said end sealing member to said opening of said side wall upper ends and one end of said side walls.

29. The system as defined in claim 27 wherein said end sealing member includes releasable securing means between said end sealing means to insert one of said pipes therethrough when said securing means are released.

30. The system as defined in claim 27 wherein said end sealing member includes means for sealing said end sealing member to one end of said side walls when said side wall opening is closed.

* * * * *